United States Patent [19]

Cheung

[11] 4,329,711
[45] May 11, 1982

[54] APPARATUS FOR ENCODING OF INFORMATION

[75] Inventor: William S. H. Cheung, Hong Kong, Hong Kong

[73] Assignee: Payview Limited, Hong Kong, Hong Kong

[21] Appl. No.: 91,781

[22] Filed: Nov. 6, 1979

[30] Foreign Application Priority Data

Feb. 20, 1979 [GB] United Kingdom ............... 7905930

[51] Int. Cl.³ .............................................. H04N 7/16
[52] U.S. Cl. .................................... 358/114; 358/116; 358/122; 358/123; 358/124; 455/27
[58] Field of Search ............... 358/114, 122, 123, 116; 455/27

[56] References Cited

U.S. PATENT DOCUMENTS

| | | | |
|---|---|---|---|
| 2,789,131 | 1/1957 | Harney | 358/122 |
| 2,961,482 | 11/1960 | Wieselman et al. | 358/123 |
| 3,826,863 | 7/1974 | Johnson | 358/122 |

Primary Examiner—S. C. Buczinski
Attorney, Agent, or Firm—Stevens, Davis, Miller & Mosher

[57] ABSTRACT

Information encoding apparatus comprises at least two modulators, each operating on a different channel, means for combining the outputs of the modulators, means for applying an information signal to the modulators for modulating the carrier waves in their channels according to the information signal, a random data terminal and means responsive to the random data signal to enable the combining means to receive a carrier wave modulated with said information from individual modulators in turn. The invention also includes transmitting apparatus for transmitting the encoded information together with a signal from the random data terminal and the invention also includes receiving apparatus for receiving and decoding the information under the control of the random data signal extracted from the received signal.

6 Claims, 4 Drawing Figures

APPARATUS FOR ENCODING OF INFORMATION

This invention relates to the encoding of information ready for transmission.

Encoding of information is necessary when it is desired that the information is only receivable by certain people, for example people who subscribe to the company providing the information.

Pay TV systems use such encoding of information, and it is already known to encode both the video and the audio signals transmitted.

In order to obtain a suitable range for the transmitted signals, the video and audio signals are modulated on carrier waves, the frequency of the carrier wave being selected for good transmission characteristics and to avoid interference with other broadcasting channels. The system of U.S. Pat. No. 3,924,059 encodes the video portion of the programme by reversing the polarity of the video signal for certain periods during selected fields. A receiver without a working decoder will receive a picture in which the selected fields will contain bands of unintelligible information, although the non-selected fields will be received normally. In U.S. Pat. No. 3,924,059, the audio portion of the programme is encoded by modulating the programme audio signals onto a suppressed carrier, and the frequency range normally occupied by the programme audio signals is used to transmit a barker signal giving information about the programme to the subscriber. A receiver without a working decoder will therefore not receive the audio portion of the programme at all, but will instead receive the barker signal which is used to tell the listener what programmes can be heard by enabling the decoder. The encoding of the audio signal is not particular secure, since once the new carrier frequency of the suppressed carrier has been ascertained, the audio portion of the programme can be received by tuning to that frequency.

It is an object of the present invention to provide information encoding apparatus comprising at least two modulators, each operating on a different channel, and to provide a more secure system of encoding the information. This is achieved according to the invention by providing means for combining the outputs of said modulators, means for applying an information signal to the modulators for modulating the carrier waves in their channels according to the information signal, a random data generator and means responsive to the random data generator to enable to combining means to receive a carrier wave modulated with said information from individual modulators in turn.

A receiver without an enabled decoder tuned to one of the channels of the two modulators will receive only random portions of the information signal, since the remaining portions will have been transmitted on the other channel. If a second signal or noise is applied to the channel other than that being used for transmitting the information, the receiver without an enabled decoder will receive portions of the information signal alternating with portions of noise or a different signal, which will be even harder to understand.

The invention also includes information transmitting apparatus including the encoding apparatus as described above, and means for transmitting a signal from the random data generator together with the output of the combining means. The invention also includes a receiver for use with such a transmitter, the receiver including means for extracting the random data signal from the received signal, a demodulator for each of the channels of the encoding apparatus, means for combining the outputs of the demodulators and means for enabling the combining means to receive the demodulated information signal from the appropriate demodulator in response to the extracted random data signal.

An example of the invention will now be described with reference to the accompanying drawings in which.

Figure 1:
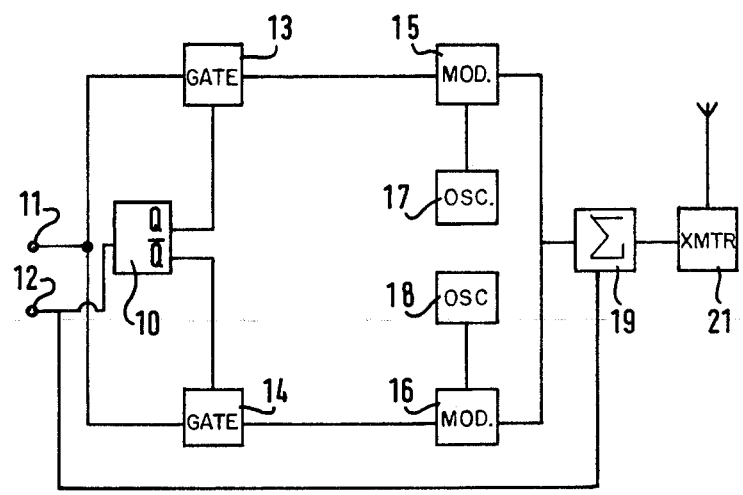
FIG. 1 is a block diagram of a transmitter.

In FIG. 1, there are two main input terminals, the information input terminal 11 and a random data input terminal 12. The terminal 11 may for example be connected to a microphone or output of a tape recorder when the information is in the form of speech or music. The random data signal may be a pulse train of random frequency.

Two channels are provided in the apparatus of FIG. 1, each channel comprising an analog gate 13 and 14 respectively and a frequency modulator 15 and 16 respectively. The gates 13 and 14 are connected to respective outputs of a flip flop 10 responsive to the random data signal. The gates 13 and 14 are enabled alternately by successive pulses of the random data signal. The modulators 15 and 16 are connected to respective oscillators 17 and 18 providing carrier signals of different frequencies. The information input terminal 11 is connected to the input of both gates 13 and 14, and the outputs of both modulators 15 and 16 are connected to a combining device 19 whose output is applied to a transmitter 21. The random data signal from terminal 12 is also applied to the combining device 19 so that the composite signal transmitted comprises a carrier wave of one frequency modulated according to the information input at terminal 11 together with a signal representing the random data signal at terminal 12. In a television transmission system, a video signal, suitably encoded as desired, is also applied to the combining device 19 for transmission by the transmitter 21. The frequency of the carrier signal alternates in a random manner according to the random data signal at terminal 12. It is preferred that the random data signal should have a frequency which varies within the range of one to fifty hertz, and preferably within the range of three to ten hertz.

Figure 2:
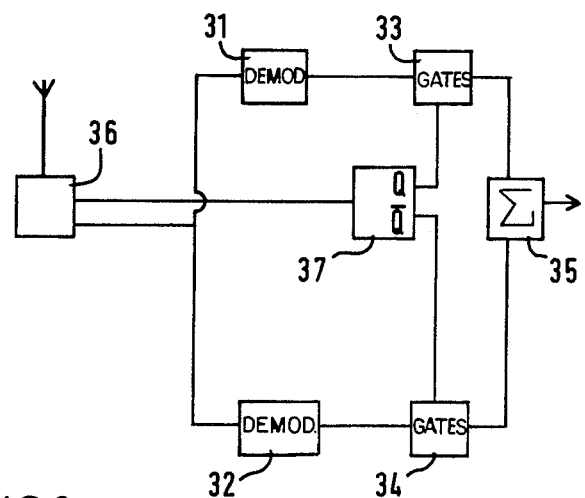
FIG. 2 is a block diagram of a receiver for use with the transmitter of FIG. 1, and FIGS. 3 and 4 are details of modifications to FIGS. 1 and 2 respectively.

At the receiver, shown in FIG. 2, the receiver signal is decoded in a corresponding manner. There are two channels, each comprising a demodulator 31 and 32 tuned respectively to the frequencies of the oscillators 17 and 18 of the transmitter, and analog gates 33 and 34, whose outputs are connected to a combining device 35. The received signal is first fed to an extracting device 36 which extracts the random data signal from the received signal and applies it to a flip flop 37 whose outputs are connected to respective gates 33 and 34.

The extracting device supplies the information modulated signal to the inputs of both demodulators and the appropriate channel will be enabled by the random data signal to supply demodulated information to the combining device 35.

In the arrangement where one channel is arranged to carry the desired information while the other channel is arranged to carry undesired information or noise, while one demodulator is supplying the desired information to the analog gate of its channel, the other demodulator will be supplying the undesired information or noise to the gate of its channel, but this latter gate will be disabled by the flip flop 37, so that the undesired information or noise will not be combined by the device 35 in the receiver output.

Figure 3:
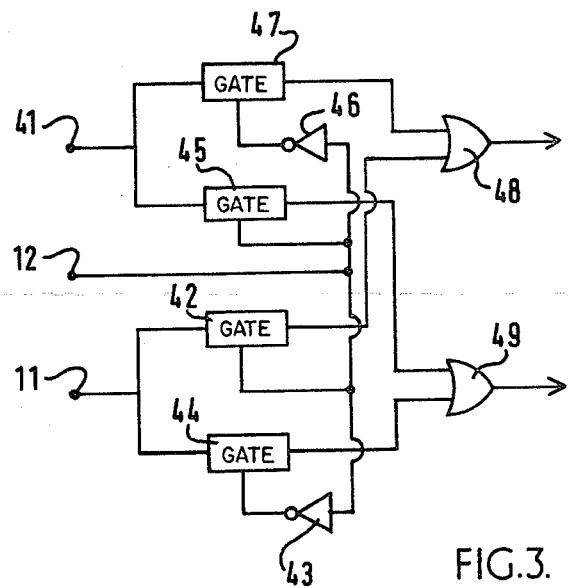
Figure 4:
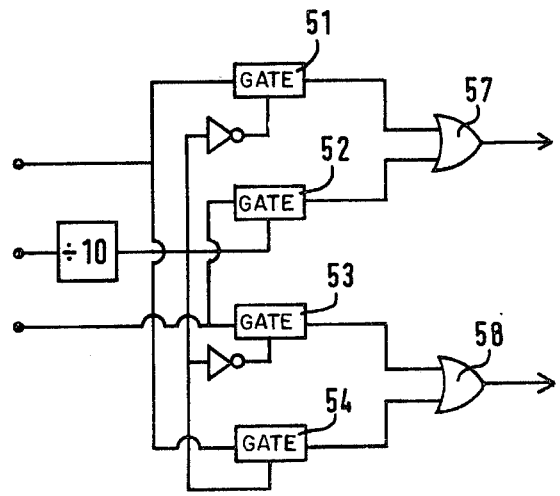

FIGS. 3 and 4 show modified details of FIGS. 1 and 2, showing how a second information signal or noise can be transmitted on the other carrier wave from that carrying the first information signal.

In FIG. 3, there is the first information signal input 11 and random data input terminal 12, as in FIG. 1, A second information input terminal 41 is provided, which may be fed with further information or with noise, as desired. In place of the single pair of gates 13 and 14 of FIG. 1, two pairs of gates are provided in FIG. 3, the input terminals 11 and 41 being connected to respective members of the two pairs. The random data signal from terminal 12 is connected directly to the gate 42 and through an inverter 43 to gate 44. The terminal 12 is connected directly to the gate 45 and through an inverter 46 to the gate 47. The outputs of gates 42 and 47 are connected to respective inputs of an OR gate 48, and the outputs of gates 44 and 45 are connected to respective input terminal of OR gate 49. Input terminal 11 is connected to the inputs of gates 42 and 44, and input terminal 41 is connected to the inputs of gates 45 and 47.

Gates 42 and 44 are enabled alternately by the signal appearing at terminal 12 to connect either the terminal 11 or the terminal 41 to the OR gate 48, and gates 44 and 45 are enabled alternately by the signal appearing at terminal 12 to connect either the terminal 41 or the terminal 11 to the OR gate 49. When the terminal 11 is connected by gate 42 to the OR gate 48, terminal 41 will be connected by gate 45 to the OR gate 49. The modification of FIG. 3 takes the place of the left-hand side of FIG. 1 up to the outputs of the analog gates 13 and 14, the outputs of OR gates 48 and 49 being used in place of the outputs of the gates 13 and 14 to operate the remainder of the apparatus of FIG. 1. The output of the combining device 19 will thus be two carrier waves, modulated respectively with the signals applied at terminals 11 and 41, the relationship to the input signals to the carrier waves being reversed in a random manner according to the signal appearing on terminal 12.

The action of the flip flop in FIG. 1 corresponds to that of the parallel direct connection and connection through the inverter 43 or 46 in FIG. 3, and either arrangement can be used as convenient.

FIG. 4 shows the corresponding modification to the decoder of FIG. 2. The two modulated carrier waves are received from the extracting device 36 of FIG. 2 and are applied to respective members of two pairs of complementary gates. The first carrier wave is applied to gates 51 and 53, and the second carrier wave to gates 52 and 54. A decoding data signal is also generated from the output of the extracting device 26 and is applied directly to gates 52 and 53, and through inverter 55 to gate 51 and inverter 56 to gate 53. The outputs of gates 51 and 52 are connected to respective inputs of OR gate 57 and the outputs of gates 53 and 54 are connected to respective inputs of OR gate 58.

During one state of the random data signal, gates 51 and 53 will be enabled, passing the first channel signal to OR gate 57 and the second channel signal to gate 58. During the other state of the random data signal, gate 58 will receive the first channel and gate 57 the second.

Since the two information input terminals 11 and 41 are alternated between the two carrier waves by the random data signal, the correspondence of the outputs of gates 57 and 58 to the terminals 11 and 41 remains constant. After suitable demodulation, the original audio information can be derived.

As is described in my co-pending application corresponding to British Patent Application No. 7,905,858, the audio signal may form part of a television signal and the random data generator may comprise a random number generator supplying a binary number and activated at the beginning of each field of the composite video signal. In the apparatus described in my co-pending application, the random number generator is activated to produce a random number at the start of each field, which in the British television system occurs at the rate of 50 hertz. If the random number generator generates pulses representing a two-digit number, the pulse frequency will be up to 100 hertz which is above the preferable frequency range for the change between channels in the encoding device described above. Such a random number generator activated at the beginning of each field therefore has its pulses in serial form passed through a divide-by-ten counter, the output of the counter being applied to the terminal 12 in the apparatus described above. This will bring the maximum frequency of the random signal down to 10 hertz. Some of the binary digits will be zero, represented by the absence of a pulse, so that the pulses in the random data signal will occur at frequencies varying between different fractions of 10 hertz. To prevent the intelligibility of undecoded signals received on one channel, it is preferred that the alternation should occur at a frequency of at least 1 hertz, and ideally between 3 and 10 hertz. If the random number generation frequency is taken above 50 hertz, no extra benefit is gained to compensate for the additional cost of higher frequency operation.

The channels corresponding to the modulators need not be completely separate. They could be provided respectively by the upper and lower side bands in an amplitude modulated transmission system.

I claim:

1. An apparatus for encoding an information signal in accordance with a data signal comprising:
    means for inverting said data signal;
    a first pair of gates each having an input connected to receive a noise signal, a control input, and an output, one of said control inputs connected to receive said data signal, the other of said control inputs connected to receive an inverted data signal from said means for inverting;
    a second pair of gates each having an input connected to receive said information signal, a control input, and an output, one of said control inputs connected to receive said data signal, the other of said control inputs being connected to receive an inverted data signal from said means for inverting;
    a first OR gate for combining the output of said gate of said first pair of gates which is controlled by said data signal and the output of said gate of said second pair which receives an inverted data signal; and
    a second OR gate for combining the output of the gate of said first pair of gates receiving an inverted data signal and the output of the gate of said second pair receiving said data signal, said OR gates providing first and second related information signals mixed with said noise signal.

2. The apparatus of claim 1, further comprising:
a first oscillator;
a second oscillator;
a first modulator for modulating a signal from said first oscillator with a signal from said first OR gate;
a second modulator for modulating a signal from said second oscillator with a signal from said second OR gate; and
means for combining signals from said modulators with said data signal whereby a composite signal is generated.

3. The apparatus of claim 2, further comprising means for transmitting said composite signal.

4. The apparatus of claim 2, wherein said data signal randomly changes.

5. An apparatus for encoding an information signal for transmission by a radio frequency transmitter comprising:
means for supplying a data signal and an inverted data signal;
means for supplying an information signal to be encoded;
first and second combining gates;
means for gating said information signal into one input of said first combining gate in response to said data signal, and for gating a noise signal into a second input of said combining gate in response to an inverted data signal whereby an information signal combined with a noise signal in a format controlled by said data signal is generated;
means for gating said information signal into one input of said second combining gate in response to said inverted data signal, and for gating said noise signal into a second input of said second combining gate in response to said data signal;
means for modulating a first carrier wave with a signal from said first combining gate, and for modulating a second carrier wave with a signal from said second combining gate whereby first and second modulated carrier waves are produced;
means for combining said modulated carrier waves with said data signal whereby a composite signal for transmitting is produced; and
a transmitter for transmitting said composite signal.

6. An apparatus for decoding a composite signal comprising first and second carrier waves modulated with an information signal alternately combined with a noise signal according to a data signal comprising:
means for supplying said data signal, an inverted data signal
said first carrier wave, and said second carrier wave;
first and second gate means connected to receive said first carrier wave;
third and fourth gate means connected to receive said second carrier wave;
means for enabling said first and third gate means in response to said data signal and for enabling said second and fourth gate means in response to an inverted data signal;
means for combining signals produced from said first and fourth gate means to produce a single decoded signal;
and
means for combining signals produced from said second and third gate means to produce a second decoded signal, one of said decoded signals being substantially free of noise.

* * * * *